(12) United States Patent
Sharpe

(10) Patent No.: US 9,357,713 B1
(45) Date of Patent: Jun. 7, 2016

(54) REUSABLE WREATH FRAME ASSEMBLY

(71) Applicant: Ricky Sharpe, Rocky Mount, NC (US)

(72) Inventor: Ricky Sharpe, Rocky Mount, NC (US)

( * ) Notice: Subject to any disclaimer, the term of this patent is extended or adjusted under 35 U.S.C. 154(b) by 0 days.

(21) Appl. No.: 14/667,128

(22) Filed: Mar. 24, 2015

(51) Int. Cl.
*A01G 5/04* (2006.01)

(52) U.S. Cl.
CPC .......................................... *A01G 5/04* (2013.01)

(58) Field of Classification Search
CPC .............. A01G 5/04; A41G 1/00; A41G 1/04
USPC ........................ 428/27; 24/68 R, 311, 265 CD
See application file for complete search history.

(56) References Cited

U.S. PATENT DOCUMENTS

| 315,795 | A | * | 4/1885 | Kaufmann | 428/10 |
|---|---|---|---|---|---|
| 399,270 | A | * | 3/1889 | Kumpf et al. | 428/10 |
| 1,093,243 | A | * | 4/1914 | Beistle | 428/10 |
| 1,158,076 | A | * | 10/1915 | Rossig et al. | 428/10 |
| 1,320,693 | A | * | 11/1919 | Kaplan | 428/10 |
| 1,478,487 | A | * | 12/1923 | Ross | 428/10 |
| 1,609,056 | A | * | 11/1926 | Bouchard | 428/10 |
| 1,611,589 | A | * | 12/1926 | Janusek | 428/27 |
| 1,657,750 | A | * | 1/1928 | Hanson et al. | 428/10 |
| 1,696,221 | A | * | 12/1928 | Tubbs | 428/27 |
| 1,817,173 | A | * | 8/1931 | Brandt | 428/10 |
| 2,079,250 | A | * | 5/1937 | Grisolia | 428/10 |
| 2,227,187 | A | * | 12/1940 | Hanson | 428/10 |
| 2,727,326 | A | * | 12/1955 | MacGregor | 428/10 |
| 3,046,685 | A | * | 7/1962 | Blum | 428/11 |
| 3,110,647 | A | * | 11/1963 | Tong | 428/27 |
| 3,591,442 | A | * | 7/1971 | Matesi | 28/10 |
| 4,144,365 | A | * | 3/1979 | Scudder et al. | 428/10 |
| 5,789,043 | A | * | 8/1998 | Law et al. | 428/10 |
| 7,217,446 | B2 | * | 5/2007 | Moody | 428/10 |
| 2006/0117629 | A1 | * | 6/2006 | Errington | 40/658 |
| 2010/0304050 | A1 | * | 12/2010 | Kwok | 428/10 |

* cited by examiner

*Primary Examiner* — Humera Sheikh
*Assistant Examiner* — Stephanie Cox
(74) *Attorney, Agent, or Firm* — Coats and Bennett PLLC

(57) ABSTRACT

A reusable wreath frame assembly is configured to receive and hold wreath material. The frame assembly includes a frame that is configured to form the back of a wreath and there is provided a multi-link fastening assembly secured to the frame and operative to assume a fastened mode where the multi-link fastening assembly extends from the frame and wraps around the wreath material to secure the wreath material to the frame. Wreath material supported on the frame assembly can be removed at the end of a season, for example, and the frame assembly can be stored and in the future can be reused to hold and support new wreath material.

11 Claims, 4 Drawing Sheets

REUSABLE WREATH FRAME ASSEMBLY

BACKGROUND

Each year millions of people across the world flock to Christmas tree farms in search of the perfect wreath to serve as a focal point of their seasonal decorations. Wreaths of all styles are a part of Christmas traditions in many households and remain so over generations. Composed of lush greenery and articulate ribbonry these wreaths are truly a piece of artistry and skillful craftsmanship. However, each year these extravagant wreaths are merely discarded at the end of the holiday season. While the greenery and decorative ornamentation may be withered, it is unnecessary to shed the entire wreath. Disposing of millions of wreaths each year is not only wasteful but also economically inefficient for the consumer.

Wreath manufacturers often struggle to keep up with the large influx of demand for these popular wreaths during the holiday season. Most wreaths are handmade and customized to the consumer's desire, which can be a tedious process for the craftsman. Constructing a symmetrical and uniform wreath for the customer can be a difficult task when given only select materials and criteria. In addition, the cost of such a piece is often driven up based on the time and detail put into construction. Having a base frame from which to construct each wreath would not only expedite the production process but would also lead to less discarded decorations at the end of the season.

Therefore, there is a need for a basic framework in which occasional wreaths of all types can be manufactured.

SUMMARY

The present invention relates to a reusable wreath frame assembly. The reusable wreath frame assembly is configured to at least partially encircle wreath material and retain the wreath material to the frame. In one exemplary embodiment the wreath frame assembly comprises a frame structure and a multi-link fastener that is mounted to the frame structure. The multi-link fastener is adapted to extend at least partially around the wreath material and connects to bind and secure the wreath material to the adjacent frame structure.

Other objects and advantages of the present invention will become apparent and obvious from a study of the following description and the accompanying drawings which are merely illustrative of such invention.

DETAILED DESCRIPTION

Figure 1:
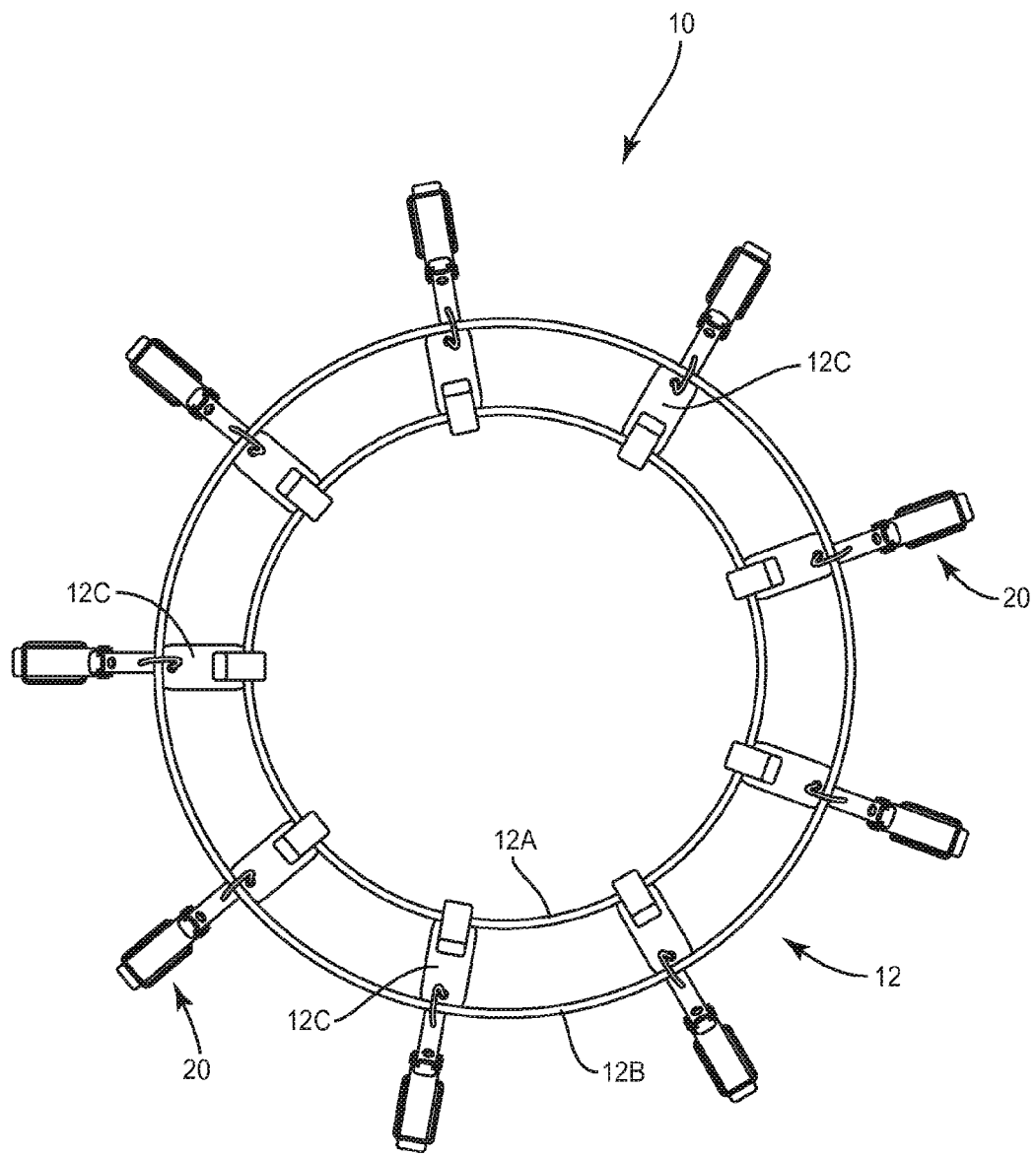
FIG. 1 is a plan view of the reusable wreath frame assembly of the present invention.
Figure 2:
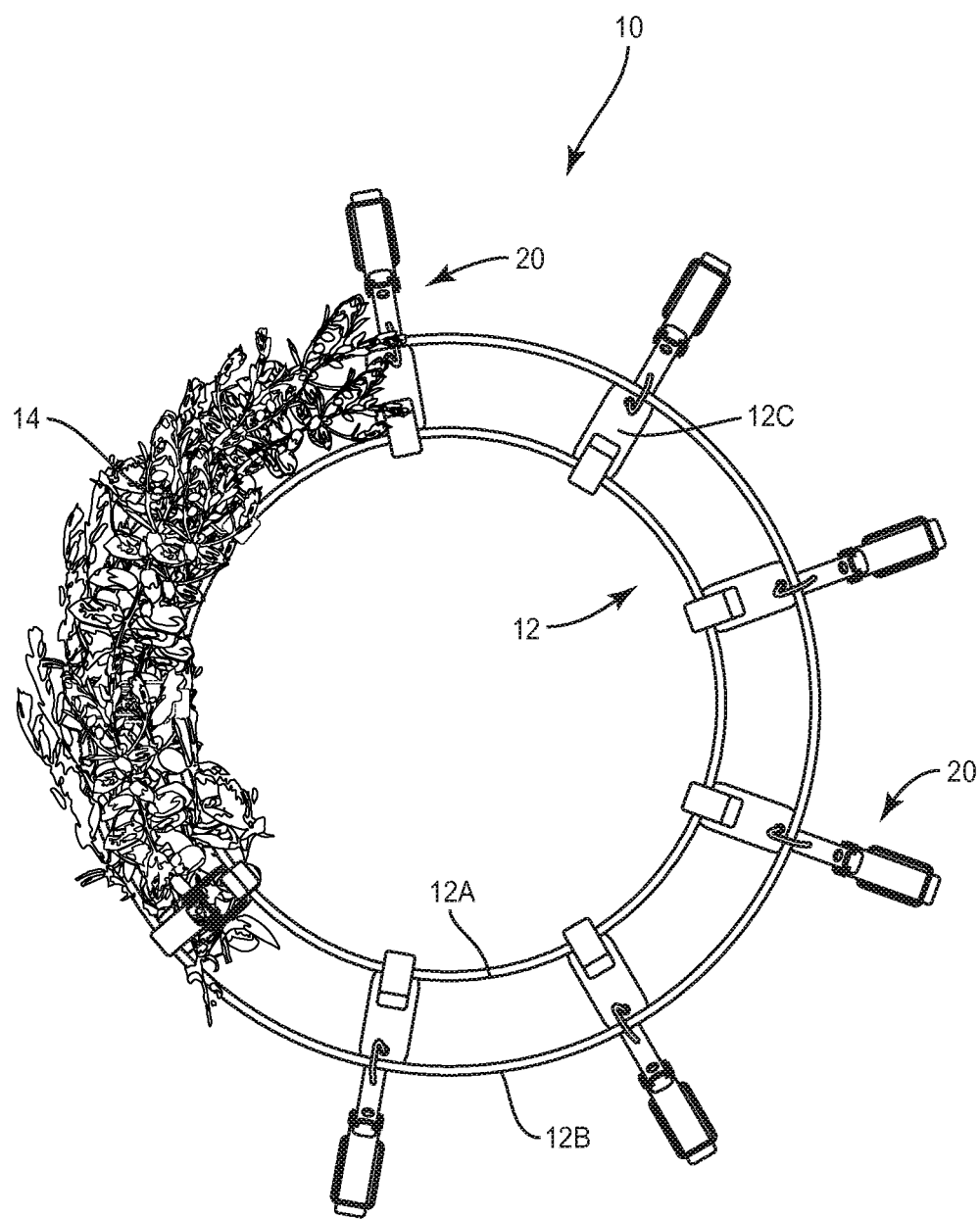
FIG. 2 is a view similar to FIG. 1 but showing wreath material secured to a portion of the frame assembly.

With further reference to the drawings, particularly FIG. 1, the reusable wreath frame assembly of the present invention is shown therein and indicated generally by the numeral 10. Frame assembly 10 includes a frame structure indicated generally by the numeral 12. Frame structure 12 includes an inner member 12A, outer member 12B and frame connectors 12C. It should be noted that the inner member 12A and outer member 12B are concentric and may have varying diameters. Frame connectors 12C are circumferentially spaced around the frame structure 12. Together the inner member 12A, outer member 12B and frame connectors 12C form a full circle support structure for wreath material 14. Frame structure 12 can be constructed of various materials such as metal, plastic, wood or any other suitable material. As shown in FIG. 2 the frame structure 12 serves as a foundation or support for wreath material 14. Wreath material 14 may be composed of a variety of materials that are conventionally incorporated into wreaths. Exemplary material includes greenery, bows, ribbons and even craft articles. It should be appreciated that the frame structure 12 discussed above and shown in the drawings is an exemplary embodiment and that other designs are envisioned. For example, the frame structure may not include two spaced apart members but could comprise a round or arcuate annular structure or, for example, could include a single curved member.

Secured to the frame structure 12 is a series of multi-link fastening assemblies, each being generally referred to by the numeral 20. See FIG. 3 for example. As can be seen from the drawings, each multi-link fastening assembly 20 is designed to assume a fastened mode or an unfastened mode. When disposed in the fastened mode, each multi-link fastening assembly 20 extends around or wraps around a portion of wreath material 14 supported on the frame structure 12. See FIG. 4. FIG. 1 shows each multi-link fastening assembly in an unfastened or open mode.

Figure 3:
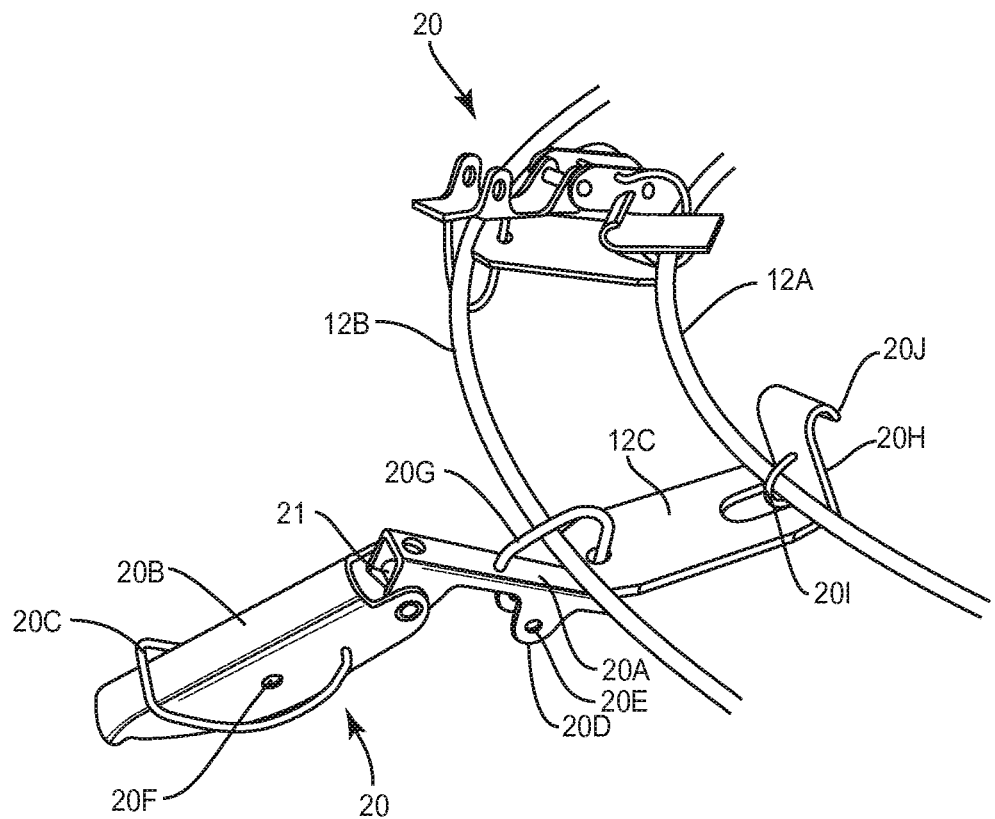
FIG. 3 is a fragmentary perspective view of a portion of the wreath frame assembly.

With particular reference to FIG. 3, the multi-link fastening assembly 20 includes a series of interconnected rigid links. In one embodiment, the multi-link fastening assembly includes a base 20A and a lever 20B pivotally connected together. A hook or inner connector 20C is pivotally connected to the lever 20B. A connector 20G connects the base 20A to the frame structure 12. Note that connector 20G is in the form of a loop connector that extends through the frame connector 12C. This enables the base 20A to be moved or rotated with respect to the frame structure 12. Note that base 20A, lever 20B, interconnector 20C and connector 20G are all interconnected to one portion of the frame structure 12.

Also forming a part of the multi-link fastening assembly 20 is a catch 20H and a catch connector 20I. See FIG. 3. Catch 20H includes a turned lip 20J. Connector 20I is a loop-type connector that extends through an opening in the frame connector 12C and allows the catch 20H to move or rotate with respect to the frame structure. As will be discussed below, in the fastened mode, the interconnector or hook 20C extends over a bunch or group of wreath material and hooks into the lip 20J of the catch 20H. In one embodiment, when fastened around wreath material, the multi-link fastening assembly 20 tends to compress the wreath material and hold the wreath material firmly and securely about the frame structure 12.

Figure 4:
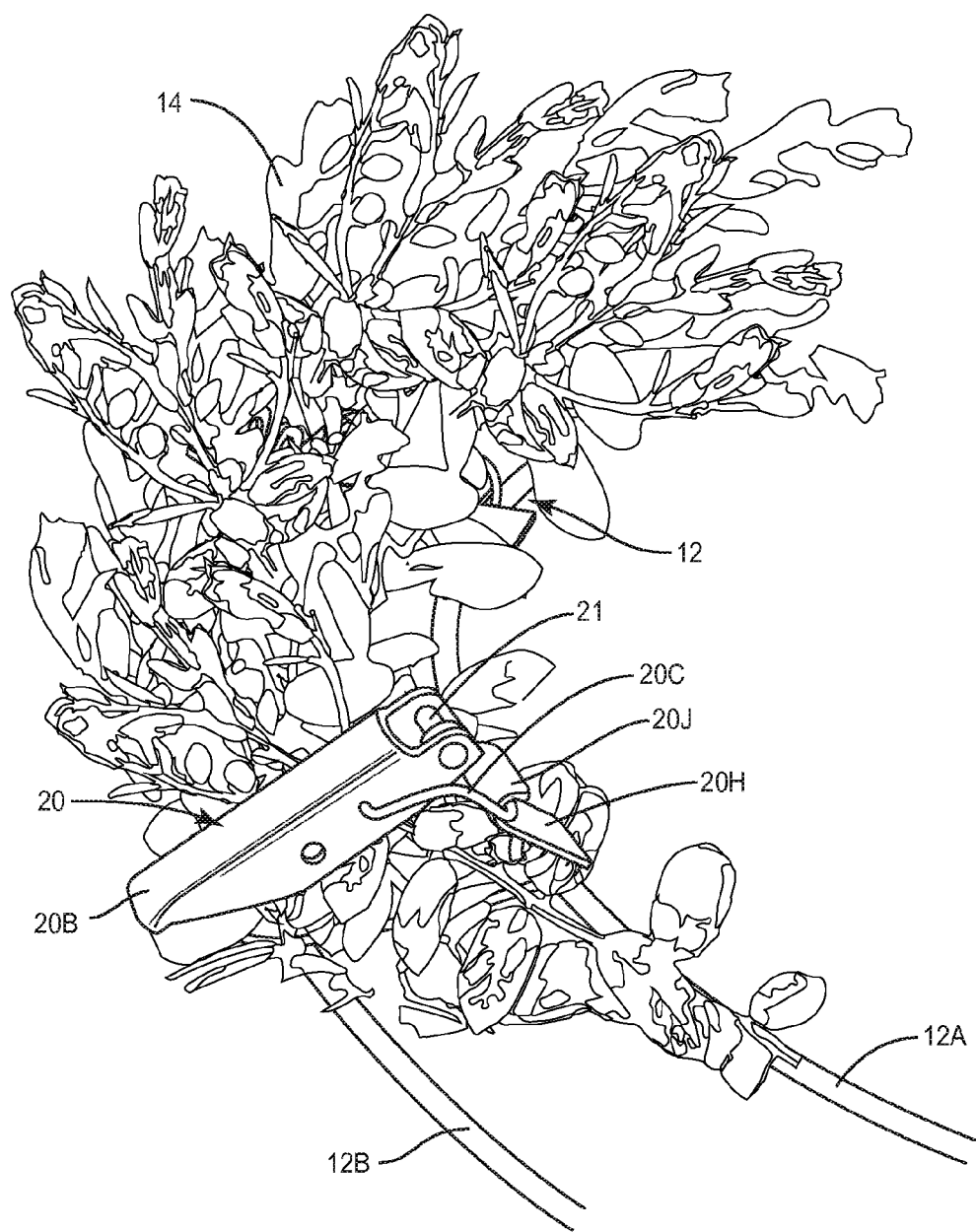
FIG. 4 is a view similar to FIG. 3 but showing wreath material secured to the frame assembly.

FIG. 3 shows the multi-link fastener 20 in an inoperative disconnected position while FIG. 4 shows the multi-link fastener 20 in an operative and connected position with wreath material 14 retained on the frame structure 12. In this embodiment, the multi-link fastening assembly 20 is an over-center latch mechanism. When the over-center latch mechanism is in the connected position the base 20A and lever 20B are generally positioned such that over-center latch mechanism remains latched. As seen in FIG. 4, the configuration of the multi-link fastening assembly is such that the compression of the wreath material tends to cause the multi-link fastening assembly 20 to remain latched. Note the orientation of the pivot pin 21 that connects the base 20A to the lever 20B and its relationship to the pivot axis of interconnector or hook 20C that is pivotally connected to the lever 20B. The compression of the wreath material as viewed in FIG. 4 exerts an upward force and, because of the orientations of the pivot axes just described, the interconnector or hook 20C remains latched or connected to the latch 20H. In order to release the over-center configuration, one engages the remote end of the lever 20B and rotates the same generally clockwise as viewed in FIG. 4. This will enable the interconnector 20C to be disengaged from the lip 20J of the catch 20H.

In another embodiment, the lever 20B can be fastened or locked to a base 20A. Note in FIG. 3 where the base 20A includes a pair of ears 20D, with each ear having an opening 20E. Further, the lever 20B includes a pair of openings 20F. When the lever 20B is rotated onto the base 20A, shown in FIG. 4, the openings 20E and 20F align. A locking pin (not shown) can be inserted through the openings 20E and 20F, effectively locking the lever 20B to the base 20A. This assures that the wreath material supported on the frame structure and partially encircled by the multi-link fastening assembly 20 is retained on the frame structure.

Figure 3A:
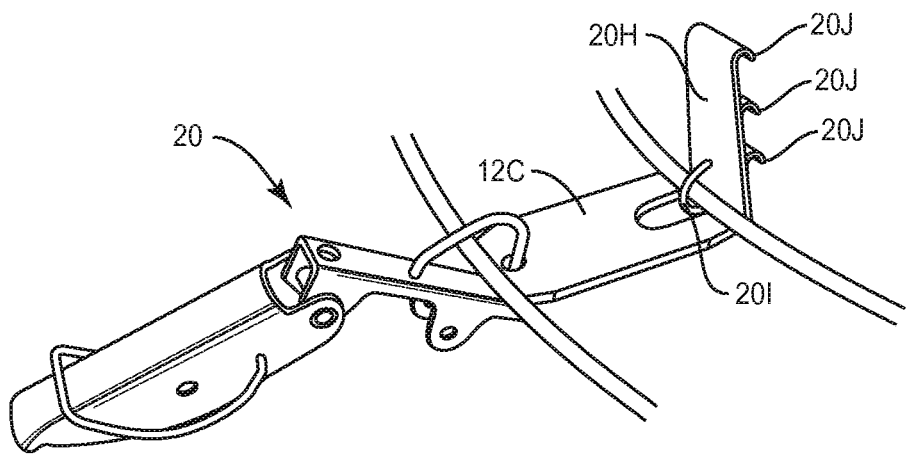
FIG. 3A is a fragmentary perspective view of an alternate embodiment for one link of a multi-link fastening assembly that forms part of the wreath frame.

FIG. 3A shows an alternate design for the catch 20H. Note that in this design, catch 20H includes a series of hook-shaped lips. This allows the effective length of the multi-link fastening assembly 20 to be adjusted to accommodate varying sizes of wreath material 14 to be secured to the frame structure 12.

The present invention can be used to construct wreathes of all types. Wreath material is gathered and consolidated into bunches. As described above, the specific wreath material employed can comprise various types of material (artificial or non-artificial). The size of the individual bunches can vary. They can vary in length and effective diameter. Typically, the bunches are sized to be secured on the frame structure such that a single bunch is retained by one or two fasteners. One of the advantages of the reusable wreath frame assembly of the present invention lies in its flexibility. Note that each end of the multi-link fastening assembly 20 is movably connected to the frame structure 12. This allows the various rigid links that comprise the assembly to be manipulated and adjusted around the bunch of wreath material 14 being secured to the frame structure 12. This greatly facilitates the adjustment and closure of the fastening assembly 20. In addition, all of the individual links, in the embodiment shown herein, are movably connected to adjacent links. This too facilitates the manipulation and placement of the links around the wreath material prior to completing the fastening arrangement.

The wreath frame assembly 10 makes constructing a wreath elementary and allows consumers to create unique wreaths using a plethora of materials that can be shaped and secured within the wreath frame structure. This reusable wreath frame assembly 10 is not only economical and environmentally friendly, but it also allows for and encourages creativity on the part of consumers. That is, while the reusable wreath frame assembly can be decorated with wreath material by a professional wreath maker, it encourages typical consumers to try their hand at creating a wreath by bunching wreath material together and securing it within the various fasteners that are mounted around the frame structure. Aside from encouraging creativity, the present invention provides an economical frame structure for a wreath that can be reused time after time. Over time, the present invention will reduce the cost of wreaths because the basic frame structure can easily be reused.

Finally, the reusable wreath frame assembly of the present invention has the advantage of being easy to use. The fasteners 20 are not complicated and are easy to manipulate by hand. Moreover, the fasteners are of the type that do not require precision in assembling the wreath material. The fasteners are flexible inasmuch as they are designed to encompass and retain bunches of wreath material of varying sizes.

It will be appreciated by those skilled in the art that the structures and mechanisms shown in the drawings and described herein are exemplary embodiments for the reusable wreath frame. Both the frame structure 12 and the multi-link fastening assembly 20 can vary in design. That is, the frame structure 12 can be constructed in various ways using various materials. The same holds true for the multi-link fastening assembly 20. Various interconnective link designs can be employed to form a fastening assembly for engaging and retaining the wreath material 14 about the frame structure 12.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A reusable wreath frame assembly for supporting and retaining wreath material, the reusable wreath frame assembly comprising:
   a frame that forms a wreath back and configured to extend adjacent the wreath material;
   a plurality of multi-link fastening assemblies secured in spaced apart relationship to the frame and operative to assume a fastened mode and an unfastened mode where the multi-link fastening assemblies extend from the frame and wraps around the wreath material to secure the wreath material to the frame when in the fastened mode and wherein when the multi-link fastening assemblies are in the unfastened mode, wreath material can be placed on the frame;
   each multi-link fastening assembly including a series of interconnected rigid links wherein at least two of the rigid links are connected to the frame and moveable with respect to the frame;
   wherein each multi-link fastening assembly is configured such that when in the fastened mode the rigid links wrap around the wreath material and compress the wreath material adjacent the frame such that the wreath material is bound by the frame and the multi-link fastening assembly; and
   wherein each multi-link fastening assembly comprises at least five rigid links including two rigid links that are moveably connected to the frame, and wherein three additional rigid links are interconnected between the two links that are connected to the frame when the multi-link fastening assembly assumes the fastened mode.

2. The reusable wreath frame assembly of claim 1 wherein each multi-link fastening assembly forms an over-center fastening mechanism that enables each multi-link fastening assembly to be fastened around the wreath material.

3. The reusable wreath frame assembly of claim 1 wherein at least one link of the multi-link fastening assembly assumes a J-shape and wherein at least another link of the multi-link fastening assembly is configured to connect to the J-shaped link.

4. The reusable wreath frame assembly of claim 1 wherein the frame comprises a pair of concentric members including an inner member and an outer member; and wherein there is provided a series of circumferentially spaced frame connectors that extend between the inner and outer members.

5. A reusable wreath frame assembly comprising:
frame;
the frame configured to receive and support wreath material;
a plurality of spaced apart over-center latch mechanisms secured to the frame for retaining the wreath material on the frame.

6. The reusable wreath frame assembly of claim 5, wherein each over-center latch mechanism comprises:
a. a catch movably mounted to the frame;
b. a base spaced from the catch and movably mounted to the frame;
c. a hook and lever assembly mounted to the base and including a hook and a lever pivotally mounted to the hook;
d. wherein in retaining the wreath material to the frame the hook engages the catch and the lever is rotated with respect to the base to an over-center latched position such that the catch, hook and lever surround at least a portion of the wreath material.

7. The reusable wreath frame assembly of claim 6, wherein the frame comprises a pair of concentric members including an inner member and outer member.

8. The reusable wreath frame assembly of claim 7, wherein the frame includes a series of spaced apart frame connectors with each frame connector extending between the inner and outer members.

9. The reusable wreath frame assembly of claim 8, wherein each frame connector extends generally between the catch and the hook and lever assembly.

10. A reusable wreath frame assembly for supporting wreath material comprising:
a. a frame structure including:
i. an inner circular member;
ii. an outer circular member;
iii. a series of spaced apart frame connectors interconnected between the inner and outer members;
b. a series of over-center latch mechanisms associated with the frame structure for engaging and retaining wreath material around the frame structure, each over-center latch mechanism including:
i. a catch;
ii. a catch connector movably mounting the catch to the frame structure;
iii. a base;
iv. a base connector movably mounting the base to the frame structure;
v. a lever pivotally connected to the base;
vi. a hook pivotally connected to the lever and operative to connect to the catch when the over-center latch mechanism is disposed in a closed position and retains wreath material to the frame structure.

11. The reusable wreath frame assembly of claim 10, wherein the catch includes a series of retainers formed on the catch to enable the over-center latch mechanism to be adjusted with respect to the catch.

\* \* \* \* \*